United States Patent
Choe

(10) Patent No.: US 10,974,711 B2
(45) Date of Patent: Apr. 13, 2021

(54) ELECTRONIC PARKING BRAKE SYSTEM AND CONTROL METHOD THEREOF

(71) Applicant: MANDO CORPORATION, Pyeongtaek-si (KR)

(72) Inventor: Jin Yeong Choe, Yongin-si (KR)

(73) Assignee: MANDO CORPORATION, Pyeongtaek-si (KR)

(*) Notice: Subject to any disclaimer, the term of this patent is extended or adjusted under 35 U.S.C. 154(b) by 169 days.

(21) Appl. No.: 15/784,928

(22) Filed: Oct. 16, 2017

(65) Prior Publication Data
US 2018/0126973 A1   May 10, 2018

(30) Foreign Application Priority Data

Oct. 18, 2016 (KR) .................. 10-2016-0135011

(51) Int. Cl.
*B60T 17/22*   (2006.01)
*B60T 13/74*   (2006.01)
(Continued)

(52) U.S. Cl.
CPC .......... *B60T 17/221* (2013.01); *B60T 13/741* (2013.01); *F16D 55/226* (2013.01); *F16D 65/18* (2013.01);
(Continued)

(58) Field of Classification Search
CPC ............... B60T 17/221; B60T 13/741; B60T 2270/406; F16D 65/183; F16D 55/226;
(Continued)

(56) References Cited

U.S. PATENT DOCUMENTS 10,214,195 B1* 2/2019 Skweres ............... B60T 17/228
2013/0314222 A1* 11/2013 Park ....................... B60Q 1/00
340/453

(Continued)

FOREIGN PATENT DOCUMENTS

CN           104114426 A    10/2014
KR    10-2000-0056202 A     9/2000
(Continued)

OTHER PUBLICATIONS

The First Office Action issued in Chinese Patent Application No. 201710965543.0 dated Dec. 15, 2020.

*Primary Examiner* — Peter D Nolan
*Assistant Examiner* — Ashley L Redhead, Jr.
(74) *Attorney, Agent, or Firm* — Morgan, Lewis & Bockius LLP

(57) ABSTRACT

Disclosed are an electronic parking brake system and a control method thereof. The electronic parking brake system according to an embodiment of the present disclosure which comprises an EPB (Electronic Parking Brake) actuator operated by an electric motor, comprises a motor driving unit for driving the electric motor of the EPB actuator, a current sensing unit for sensing a current flowing in the electric motor, and an electronic control unit for accumulating an electric charge amount put into the electric motor from the time when a motor current change rate is higher than a preset change rate if the motor current change rate according to the motor current sensed through the current sensing unit during a parking operation is higher than the preset change rate and determining a stuck failure of the electric motor based on the accumulated electric charge amount.

8 Claims, 6 Drawing Sheets

(51) Int. Cl.
*F16D 65/18* (2006.01)
*F16D 55/226* (2006.01)
*F16D 125/40* (2012.01)
*F16D 121/24* (2012.01)

(52) U.S. Cl.
CPC ...... *F16D 65/183* (2013.01); *B60T 2270/406* (2013.01); *F16D 2121/24* (2013.01); *F16D 2125/40* (2013.01)

(58) Field of Classification Search
CPC ... F16D 65/18; F16D 2125/40; F16D 2121/24
See application file for complete search history.

(56) References Cited

U.S. PATENT DOCUMENTS

| | | | | |
|---|---|---|---|---|
| 2014/0156141 A1* | 6/2014 | Yabuguchi | ................ | B60T 7/02 701/36 |
| 2015/0019099 A1* | 1/2015 | Imai | .......................... | B60T 7/12 701/70 |
| 2015/0336547 A1* | 11/2015 | Dagan | ....................... | B60T 7/22 701/70 |
| 2015/0369317 A1* | 12/2015 | Choe | ....................... | F16D 65/18 701/70 |
| 2016/0356330 A1* | 12/2016 | Baehrle-Miller | ........ | B60T 7/107 |
| 2017/0028975 A1* | 2/2017 | Suermann | ............. | B60T 13/586 |
| 2017/0097060 A1* | 4/2017 | Baehrle-Miller | ..... | B60T 13/741 |
| 2017/0190329 A1* | 7/2017 | Mannherz | ............. | B60T 13/741 |
| 2019/0054903 A1* | 2/2019 | Blattert | ..................... | B60T 7/12 |
| 2019/0135247 A1* | 5/2019 | Luo | ........................ | B60T 8/1701 |
| 2019/0135255 A1* | 5/2019 | Baehrle-Miller | ........ | B60T 7/042 |
| 2019/0193707 A1* | 6/2019 | Deljosevic | ............ | B60T 13/746 |

FOREIGN PATENT DOCUMENTS

| | | | |
|---|---|---|---|
| KR | 10-2002-0075977 A | | 10/2002 |
| KR | 10-2015-0101584 A | | 9/2015 |
| KR | 20150101584 A | * | 9/2015 |

* cited by examiner

ELECTRONIC PARKING BRAKE SYSTEM AND CONTROL METHOD THEREOF

CROSS-REFERENCE TO RELATED APPLICATION(S)

This application claims the benefit of Korean Patent Application No. 2016-0135011, filed on Oct. 18, 2016 in the Korean Intellectual Property Office, the disclosure of which is incorporated herein by reference.

BACKGROUND

1. Field

The present disclosure relates to an electronic parking brake system and a control method thereof, and more particularly to an electronic parking brake system and a control method thereof for controlling the activation or deactivation of an electronic parking brake.

2. Description of the Related Art

Recently, an electronic parking brake (EPB) system for electronically controlling the driving of a parking brake is used, which is mounted on a normal disk brake to perform a parking brake function.

The electronic parking brake system allows the parking brake to be automatically activated or deactivated according to the control determination of an electronic control unit performing a simple switch operation or the overall control even if a driver does not operate the parking brake manually.

Such electronic parking brake system includes an EPB actuator having a motor for generating a braking force and the electronic control unit for driving the EPB actuator.

The electronic control unit drives the EPB actuator according to the operating state of a switch to apply or release the parking brake.

The EPB (Electric Parking Brake) system that generates a parking braking force by the force of the motor determines the amount of force applied to a caliper by the amount of current generated in the motor.

If the amount of current generated during a parking operation is more than a certain value, it is determined that parking is completed.

If the parking operation is performed in a state where mechanical sticking in the motor occurs, the motor cannot be driven. This phenomenon is referred to as motor stuck.

When motor stuck occurs, there is no amount of force actually applied to the caliper, but the amount of current is generated relatively high. The current at this time is referred to as a stall current.

Therefore, since, conventionally, it is determined that the parking operation has been completed by the amount of electric current generated in the motor, there is no problem in the case where a stall current threshold value is lower than a target current range, but in the case where the stall current threshold value is included in the target current range, even though a motor stuck failure has occurred, it may be mistakenly determined that the parking operation has been normally completed.

SUMMARY

It is an embodiment of the present disclosure to provide an electronic parking brake system and a control method thereof that can more accurately and reliably determine a motor failure of an EPB actuator.

Additional aspects of the present disclosure will be set forth in part in the description which follows and, in part, will be obvious from the description, or may be learned by practice of the disclosure.

In accordance with one aspect of the present disclosure, there may be provided an electronic parking brake system which comprises an EPB (Electronic Parking Brake) actuator operated by an electric motor, comprising a motor driving unit for driving the electric motor of the EPB actuator, a current sensing unit for sensing a current flowing in the electric motor, and an electronic control unit for accumulating an electric charge amount put into the electric motor from the time when a motor current change rate is higher than a preset change rate if the motor current change rate according to the motor current sensed through the current sensing unit during a parking operation is higher than the preset change rate and determining a stuck failure of the electric motor based on the accumulated electric charge amount.

Further, the electric charge amount put into the electric motor may be accumulated from the time when the motor current change rate is higher than a preset first change rate until the motor current change rate is lower than a second change rate preset to be lower than the preset first change rate.

Further, the electronic control unit may determine to be a stuck failure of the electric motor if the accumulated electric charge amount is larger than a preset electric charge amount.

In accordance with another aspect of the present disclosure, there may be provided an electronic parking brake system which comprises an EPB (Electronic Parking Brake) actuator operated by an electric motor, comprising a motor driving unit for driving the electric motor of the EPB actuator, a current sensing unit for sensing a current flowing in the electric motor, and an electronic control unit for calculating an electric charge amount put into the electric motor utilizing a motor current sensed through the current sensing unit during a parking operation, accumulating the calculated electric charge amount, and determining to be a stuck failure of the electric motor if a change rate of the accumulated electric charge amount is higher than a preset change rate.

In accordance with another aspect of the present disclosure, there may be provided a control method of an electronic parking brake system comprising an EPB (Electronic Parking Brake) actuator operated by an electric motor, comprising sensing a current flowing in the electric motor during a parking operation, calculating a motor current change rate according to the sensed motor current, accumulating an electric charge amount put into the electric motor from the time when the calculated motor current change rate is higher than a preset change rate if the calculated motor current change rate is higher than the preset change rate, and determining to be a stuck failure of the electric motor if the accumulated electric charge amount is larger than a preset electric charge amount.

Further, the step of accumulating the electric charge amount may accumulate the electric charge amount put into the electric motor from the time when the motor current change rate is higher than a preset first change rate until the motor current change rate is lower than a second change rate preset to be lower than the preset first change rate.

In accordance with another aspect of the present disclosure, there may be provided a control method of an electronic parking brake system comprising an EPB (Electronic Parking Brake) actuator operated by an electric motor, comprising sensing a current flowing in the electric motor during a parking operation, calculating an electric charge amount put into the electric motor utilizing the sensed motor current, accumulating the calculated electric charge amount, and determining to be a stuck failure of the electric motor if a change rate of the accumulated electric charge amount is higher than a preset change rate.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
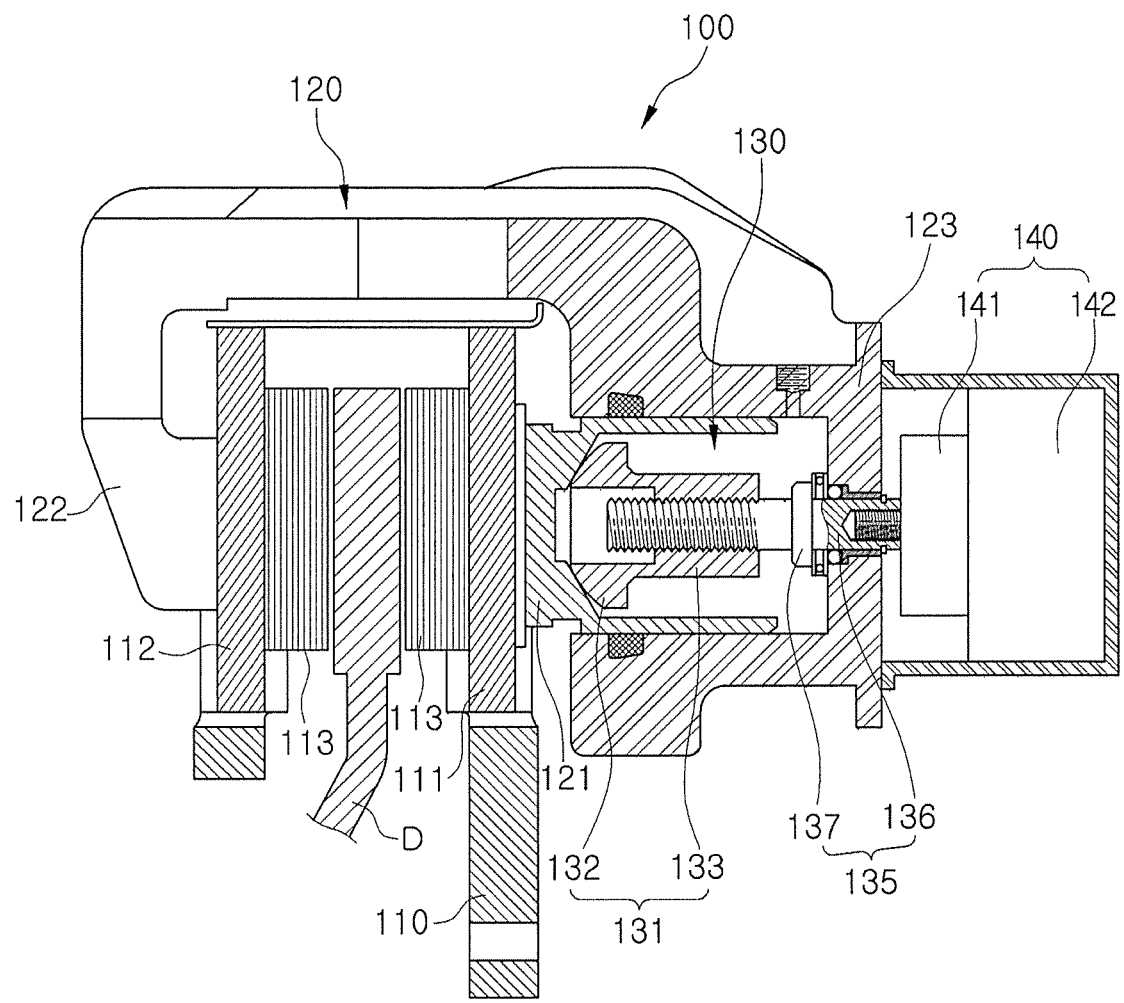
FIG. 1 is a schematic cross-sectional view of an electronic parking brake applied to an EPB system according to an embodiment of the present disclosure.

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. In order to clearly illustrate the present disclosure, parts not related to the description are omitted from the drawings, and in the drawings, the width, length, thickness, and the like of components may be exaggerated for the sake of convenience. Like reference numerals refer to like elements throughout the specification.

FIG. 1 is a schematic cross-sectional view of an electronic parking brake applied to an EPB system according to an embodiment of the present disclosure.

Referring to FIG. 1, an electronic parking brake 100 may include a carrier 110 on which a pair of pad plates 111 and 112 are mounted so as to be movable forward and backward to press a disk D rotating together with a wheel of a vehicle, a caliper housing 120 slidably installed on the carrier 110 and provided with a cylinder 123 in which a piston 121 is installed to be moved forward and backward by brake oil pressure, a power conversion unit 130 which presses the piston 121, and an EPB actuator 140 which transmits a rotational force to the power conversion unit 130.

The pair of pad plates 111 and 112 are composed of the inner pad plate 111 arranged to be in contact with the piston 121 and the outer pad plate 112 arranged to be in contact with a finger portion 122 of the caliper housing 120. The pair of pad plates 111 and 112 are installed on the carrier 110 which is fixed to a vehicle body, so as to be able to move back and forth toward opposite side surfaces of the disk D.

In addition, a friction pad 113 is attached to one surface of each of the pad plates 111 and 112 facing the disk D.

The caliper housing 120 is slidably mounted to the carrier 110. More specifically, the caliper housing 120 includes the cylinder 123 at the rear portion thereof in which the power conversion unit 130 is installed and the piston 121 is housed so as to be movable forward and backward, and the finger portion 122 at the front portion thereof that is formed to bend downwardly to actuate the outer pad plate 112. The finger portion 122 and the cylinder 123 are integrally formed.

The piston 121 is provided in a cylindrical shape having a cup shape inside and inserted into the cylinder 123 so as to be slidable. The piston 121 presses the inner pad plate 111 toward the disk D by brake oil pressure or an axial force of the power conversion unit 130 that receives a rotational force of the EPB actuator 140. Accordingly, when the oil pressure for braking is applied to the inside of the cylinder 123, the piston 121 is advanced to the inner pad plate 111 side to press the inner pad plate 111, the caliper housing 120 is operated in the opposite direction to the piston 121 by a reaction force and the finger portion 122 presses the outer pad plate 112 toward the disk D, thereby performing the braking.

The power conversion unit 130 serves to receive a rotational force from the EPB actuator 140 constituted by an electric motor 141 and a speed reducer 142, and presses the piston 121 toward the inner pad plate 111. The power conversion unit 130 includes a nut member 131 disposed in the piston 121 to be in contact with the piston 121 and a spindle member 135 screwed to the nut member 131.

The nut member 131 is disposed in the piston 121 in a limited rotation state and is screwed with the spindle member 135. The nut member 131 includes a head portion 132 provided to be in contact with the piston 121 and a coupling portion 133 that extends from the head portion 132 and is formed with an internal thread on an inner circumferential surface thereof to be screwed with the spindle member 135. The nut member 131 serves to move forward and backward according to the rotation direction of the spindle member 135 and pressurizes and releases the piston 121.

The spindle member 135 includes a shaft portion 136 which passes through the rear portion of the caliper housing 120 and is rotated by receiving the rotational force of the electric motor 141 and a flange portion 137 extending from the shaft portion 136 in a radial direction. The shaft portion 136 is rotatably installed at one end thereof by passing through the rear side of the cylinder 123, and the other end thereof is disposed in the piston 121. At this time, one side of the shaft portion 136 passing through the cylinder 123 is connected to the output shaft of the speed reducer 142 and receives the rotational force of the electric motor 141.

By the above configuration, the electronic parking brake 100 receives power through the EPB actuator 140 in the parking operation mode and rotates the spindle member 135 so that the nut member 131 presses the piston 121. Accordingly, the piston 121 presses the inner pad plate 111 and the friction pad 113 is brought into close contact with the disk D, thereby generating a parking brake force.

Figure 2:
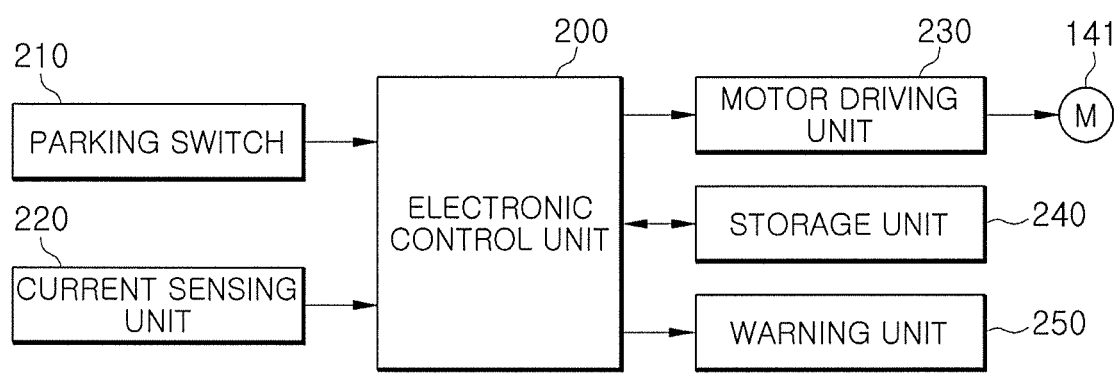
FIG. 2 is a control block diagram of an EPB system according to an embodiment of the present disclosure.

FIG. 2 is a control block diagram of an EPB system according to an embodiment of the present disclosure.

Referring to FIG. 2, an EPB system includes an electronic control unit 200 that performs the overall control related to electronic parking brake actuation.

In the electronic control unit 200, a parking switch 210, a current sensing unit 220, a motor driving unit 230, a storage unit 240, and a warning unit 250 are electrically connected.

When the parking switch 210 is turned on by the driver, the parking switch 210 transmits a parking operation signal for applying the EPB system to the electronic control unit 200, and when the parking switch 210 is turned off by the driver, the parking switch 210 transmits a parking release signal for releasing the EPB system to the electronic control unit 200. That is, the EPB system is changed to an apply state or a release state depending on the operation state of the parking switch 210.

The current sensing unit 220 senses the current flowing through the electric motor 141 and transmits the sensed current information to the electronic control unit 200. For example, the current sensing unit 220 may sense a motor current flowing through the electric motor 141 using a shunt resistor or a Hall sensor. The current sensing unit 220 may be implemented by various methods capable of sensing the motor current in addition to the shunt resistor or the Hall sensor.

The motor driving unit 230 rotates the electric motor 141 forward or backward. For example, the motor driving unit 230 may include an H-Bridge circuit composed of a plurality of power switching elements to rotate the electric motor 141 in normal and reverse directions.

Figure 3:
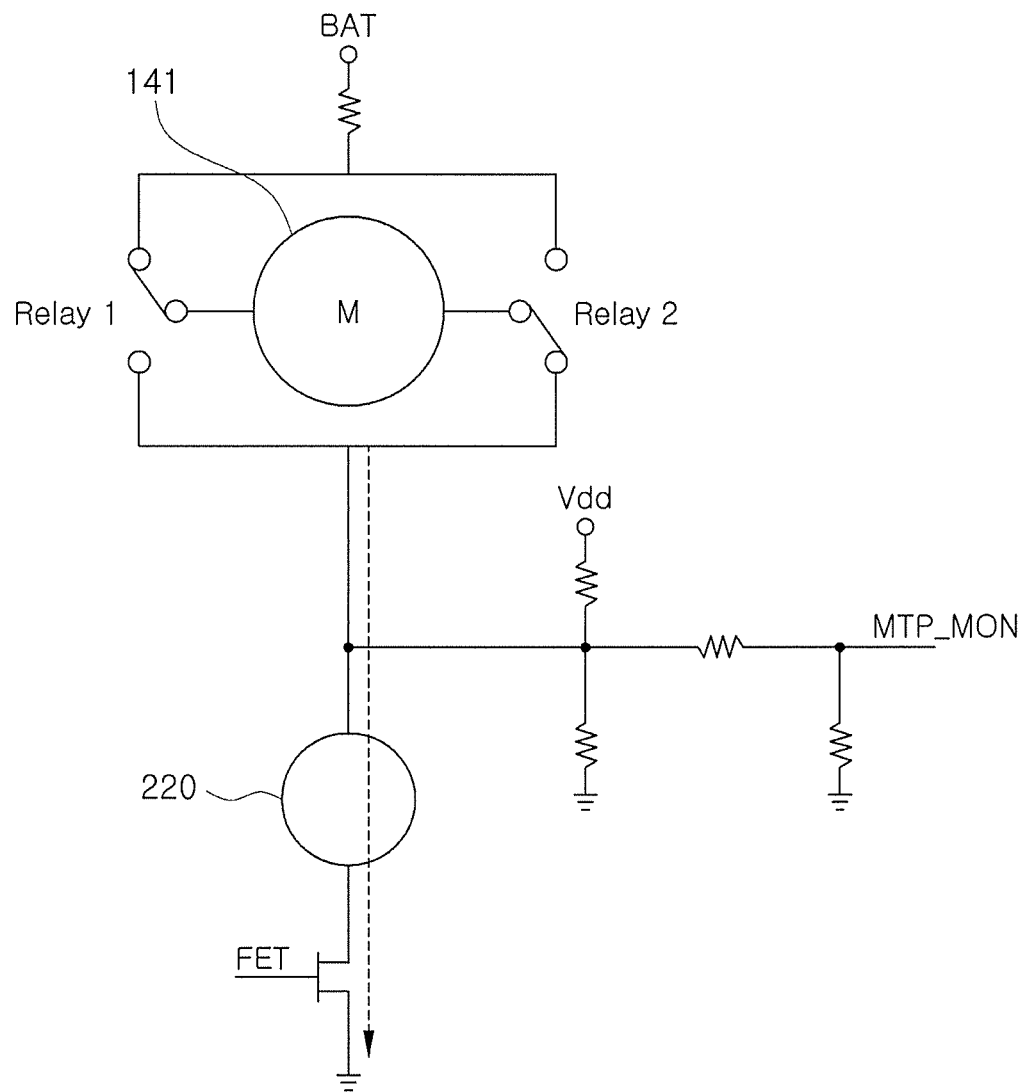
FIG. 3 is a view for explaining a current sensing unit of an EPB system according to an embodiment of the present disclosure.

FIG. 3 is a view for explaining a current sensing unit of an EPB system according to an embodiment of the present disclosure.

Referring to FIG. 3, the motor driving unit 230 may turn on a first relay (Relay 1) and at the same time turn off a second relay (Relay 2) to rotate the electric motor 141 in one direction. On the contrary, the motor driving unit 230 may turn off the first relay (Relay 1) and at the same time turn on the second relay (Relay 2) to rotate the electric motor 141 in the opposite direction. The unidirectional rotation of the electric motor 141 at the parking operation in which the electric motor 141 is rotated in one direction by the motor driving unit 230 rotates the spindle member 135 via the speed reducer 142, and the nut member 131 presses the piston 121 as the spindle member 135 rotates. Accordingly, the piston 121 presses the inner pad plate 111 to come in close contact with the disk D, thereby generating a parking brake force. When the parking operation is released, the reverse operation of the parking operation is performed.

Referring again to FIG. 2, values preset corresponding to the operation modes (parking operation and parking operation release) are stored in the storage unit 240. The storage unit 240 also stores various setting values for determining the motor stuck failure according to the operation modes. The various setting values may include a target current, a reference accumulated electric charge amount, a motor current change rate upper limit value, a motor current change rate lower limit value, and the like.

The warning unit 250 warns a driver of a motor stuck failure. The warning unit 250 may be implemented in a visual configuration such as a warning lamp installed in a vehicle's interior or an audible configuration such as a buzzer to alert a motor stuck failure by activating a warning lamp or a buzzer in accordance with a control signal of the electronic control unit 200. The warning unit 250 may be a speaker in an audible configuration such as a speaker, a speaker of a car audio system provided inside a vehicle may be used, or a separate speaker may be provided in a proper place in the vehicle.

The electronic control unit 200 performs a parking operation (Parking Apply) to provide a parking braking force by rotating the electric motor 141 of the EPB actuator 140 in one direction through the motor driving unit 230 in the parking operation mode so that the inner pad plate 111 pressed by the piston 121 moves to bring the friction pad 113 into close contact with the disk D.

The electronic control unit 200 performs a parking operation release (Parking Release) to release a parking braking force by rotating the electric motor 141 of the EPB actuator 140 in the opposite direction through the motor driving unit 230 in the parking operation release mode so that the friction pad 113 is released from the state in which it is in close contact with the disk D.

As described above, conventionally, a motor current flowing through the electric motor 141 is sensed, and it is determined whether the sensed motor current is equal to or more than a target current, and if the sensed motor current is equal to or more than the target current, it is determined that the parking operation (Parking Apply) is completed, and the motor driving is stopped.

If a motor current detected after a predetermined time (for example, 200 ms) after starting the motor drive is equal to or more than the target current, it is determined that the parking apply is completed. That is, if a motor current value generated after a certain period of time during the parking operation is equal to or greater than the target current value, it is determined that parking is completed.

If a motor current value detected without a no-load section after a predetermined time after starting the motor drive is detected for a predetermined time longer than the stall current threshold value (Istall), it may be determined as a failure. At this time, the stall current threshold value (Istall) is a threshold value of the current generated when the electric motor 141 starts driving but is not driven by an external force.

However, in the case where there is a target current value at the time of normal control within a range in which the stall current threshold value (Istall) can be generated, it is difficult to distinguish between the normal state and the motor stuck failure state, so it may be erroneously determined that the parking apply is normally completed. That is, the method of comparing the motor current value and the stall current threshold value alone may not detect the motor stuck failure.

Therefore, it is difficult to more accurately and reliably determine the stuck failure of the motor just by determining whether the motor current value is higher than the stall current threshold value.

When a motor stuck failure occurs, even if the electric motor 141 is continuously operated, the motor current does not rise but maintains a constant value. Therefore, as a result of observing the motor current change rate during the parking operation, when the motor current change rate becomes more than a certain magnitude, the electric motor 141 is continuously operated without ending the operation even if the motor current satisfies the target current. Accordingly, if the motor current is maintained at a constant value for a certain period of time, it is finally determined as a motor stuck failure.

However, when there is heat generation or a demagnetization effect of the motor, the motor current gradually decreases, and if the motor current is decreased beyond the determination range of the change rate of the motor current, the motor may not be determined as a failure. In addition, there may be an ECU (Electronic Control Unit) which cannot withstand a high current according to the specification of the motor driver.

In an embodiment of the present disclosure, the motor stuck failure is determined using the change rate of the current flowing through the electric motor 141 and the accumulated electric charge amount.

To this end, if a motor current change rate according to the motor current sensed through the current sensing unit 220 at the parking operation mode is higher than a preset first change rate, the electronic control unit 200 accumulates the electric charge amount put into the electric motor 141 from the time when the motor current change rate is higher than the preset first change rate until the motor current change rate is lower than a second change rate preset to be lower than the preset first change rate, and determines that a stuck failure of the electric motor 141 occurs if the accumulated electric charge amount is larger than a preset electric charge amount.

Figure 4:
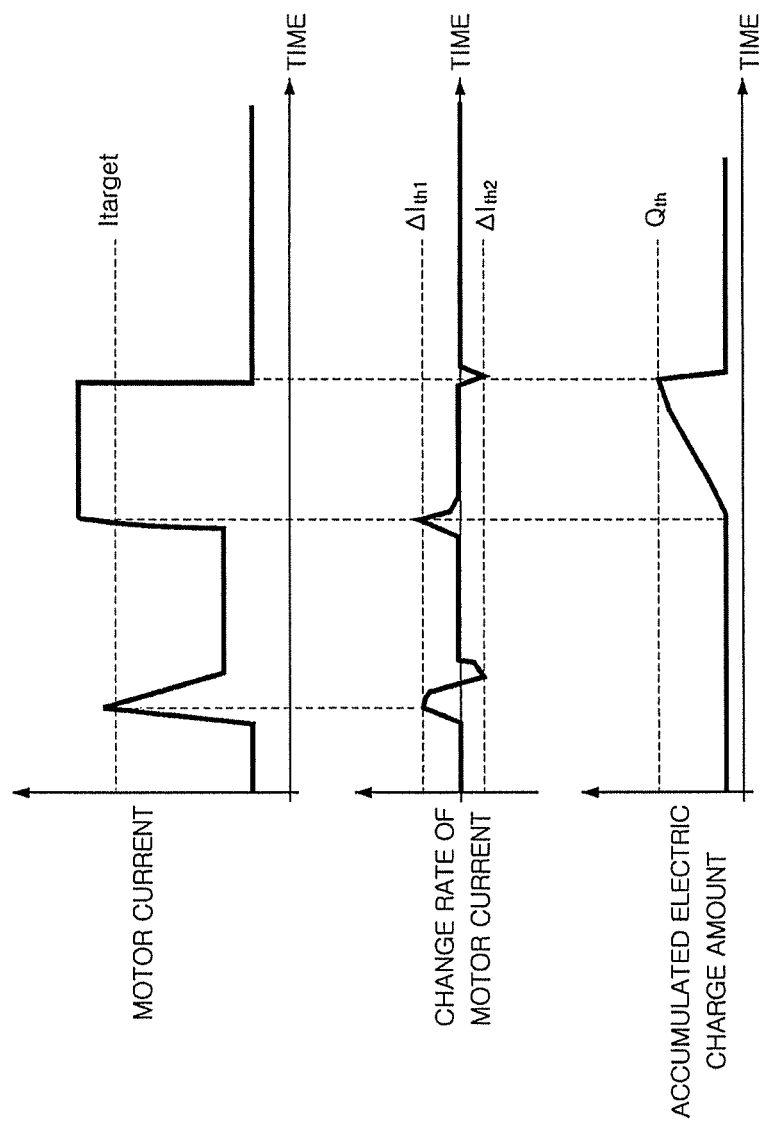
FIG. 4 is a timing chart for explaining a relationship between a motor current, a motor current change rate, and an accumulated electric charge amount for determining a motor stuck failure in an EPB system according to an embodiment of the present disclosure; and FIG. 5

FIG. 4 is a timing chart for explaining a relationship between a motor current, a motor current change rate, and an accumulated electric charge amount for determining a motor stuck failure in an EPB system according to an embodiment of the present disclosure.

Referring to FIG. 4, the electronic control unit 200 applies electric power to the electric motor 141 when a parking operation signal is inputted through the parking switch 210.

When the electric motor 141 starts rotating as electric power is applied to the electric motor 141, an inrush current flows in the electric motor 141 in an inrush section where an inrush current appears.

Until the friction pad 113 contacts the disk D by the rotation of the electric motor 141 after the inrush current flows, a non-load state in which no load is applied to the electric motor 141 is formed in a no-load section in which a current having a constant current value of 0 or more flows for a predetermined time.

At this time, a current having a constant current value of 0 or more flows through the electric motor 141 for a predetermined time.

When the friction pad 113 starts to contact the disk D, since the load acting on the electric motor 141 gradually increases in a load section in which the electric current gradually rises, the current flowing in the electric motor 141 also increases in proportion to the size of the load.

However, the current flowing through the electric motor 141 increases even in the event of a motor stuck failure. Because of this, it is difficult to distinguish between the normal parking operation state and the motor stuck failure state, and the parking operation may be erroneously determined to be normally completed.

Therefore, as a result of checking the change rate of the motor current, when the change rate of the motor current rapidly increases after the inrush section and reaches a preset first change rate ($\Delta$Ith1), the electric charge amount (Q=It) put into the electric motor 141 from that point is calculated and accumulated.

If the accumulated electric charge amount is larger than a preset electric charge amount (Qth), it is determined that a motor stuck failure has occurred. Accordingly, not only can the motor stuck failure be detected when the motor current is maintained more than the target current for a certain time, but also the motor stuck failure can be detected even if the motor current is gradually reduced due to heat generation or demagnetization of the motor. In addition, since the input electric charge amount is taken into consideration, even if the magnitude of the motor current is high, the motor stuck failure can be detected more quickly without imposing a strain on the ECU. In addition, since the motor stuck failure is determined in consideration of the input electric charge amount, the higher the motor current is, the faster the failure can be detected.

Figure 5:
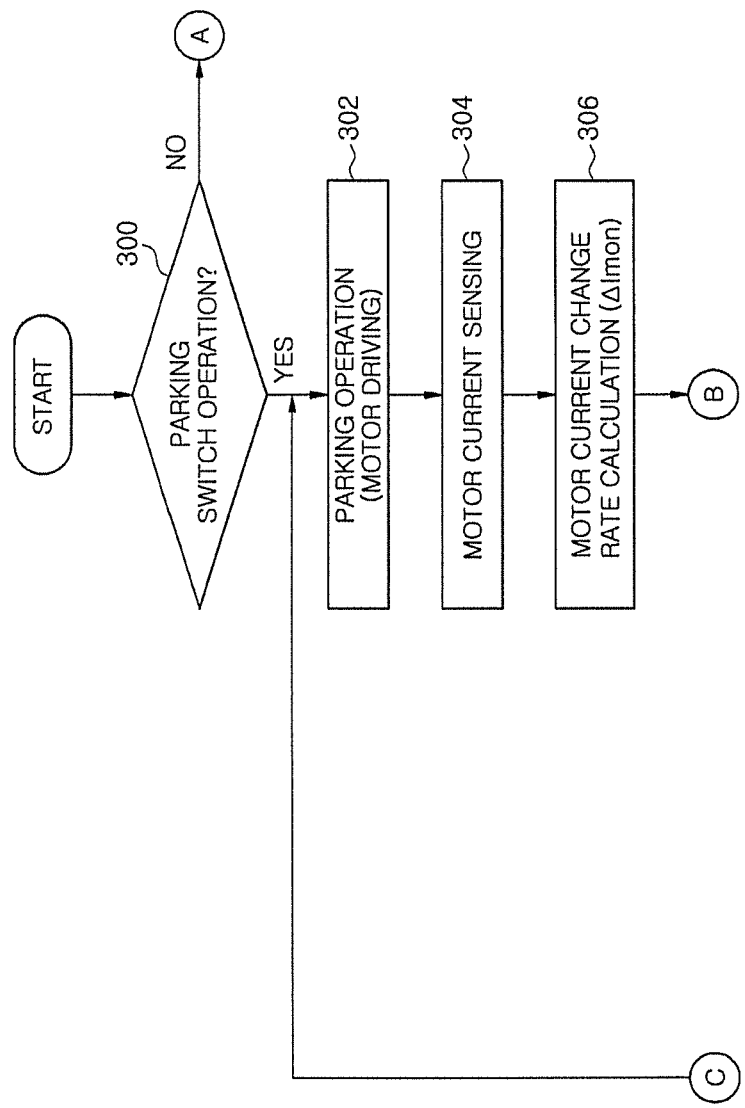
Figure 6:
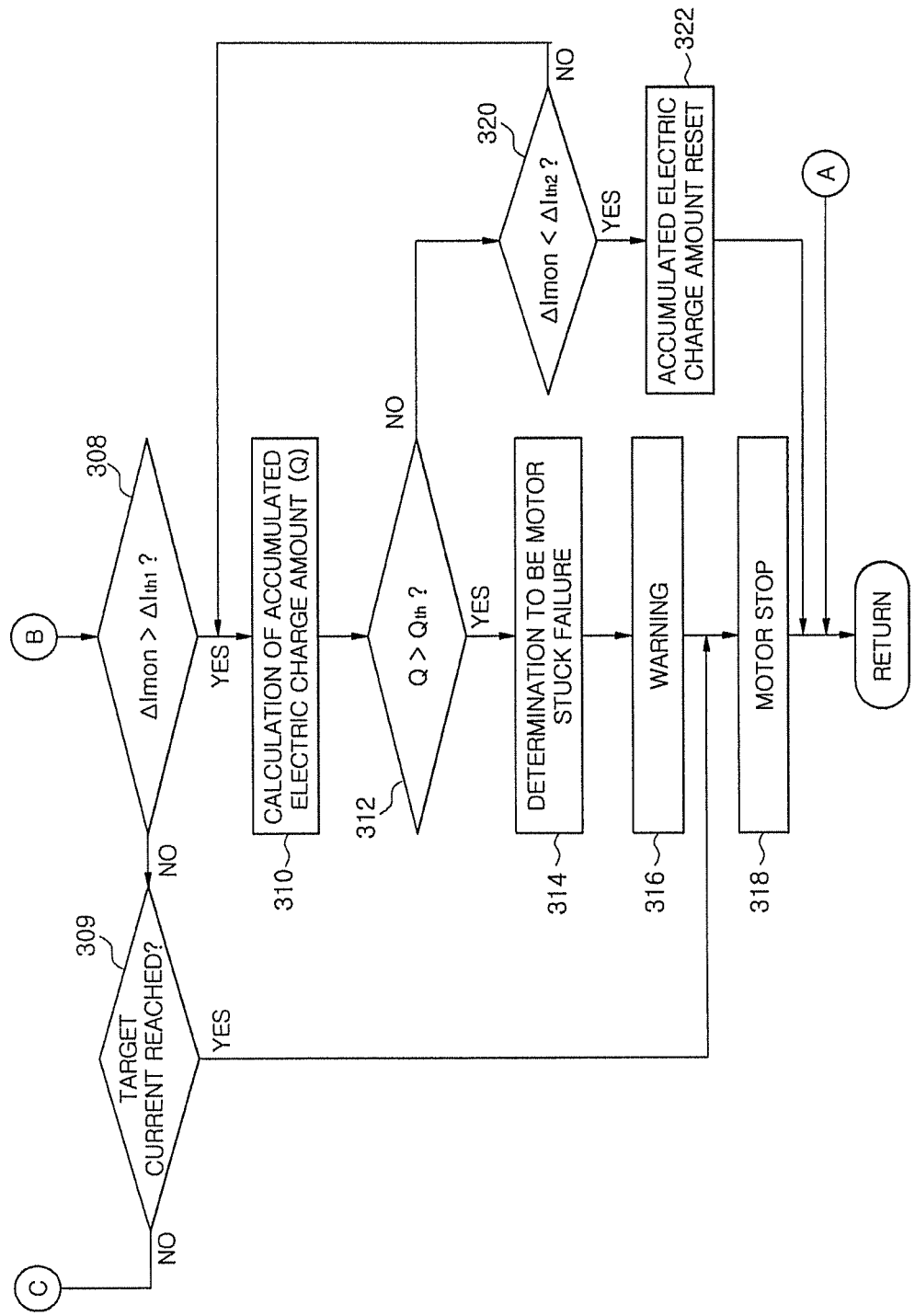
FIG. 6 is a control flowchart for a control method of an EPB system according to an embodiment of the present disclosure.

FIG. 5 and FIG. 6 is a control flowchart for a control method of an EPB system according to an embodiment of the present disclosure.

Referring to FIG. 5 and FIG. 6, first, the electronic control unit 200 determines whether a driver operates the parking switch 210 (300).

When the parking switch 210 is operated, the electronic control unit 200 performs a parking operation (Parking Apply) to provide a parking braking force by rotating the electric motor 141 of the EPB actuator 140 in one direction through the motor driving unit 230 so that the inner pad plate 111 pressed by the piston 121 moves to bring the friction pad 113 into close contact with the disk D (302).

At the same time, the electronic control unit 200 senses the current flowing in the electric motor 141 through the current sensing unit 220 (304).

Then, the electronic control unit 200 calculates a motor current change rate ($\Delta$Imon) according to the sensed motor current (306).

After calculating the motor current change rate ($\Delta$Imon), the electronic control unit 200 compares the calculated motor current change rate ($\Delta$Imon) with a preset first change rate ($\Delta$Ith1) and determines whether the calculated motor current change rate ($\Delta$Imon) exceeds the preset first change rate ($\Delta$Ith1) (308).

If the motor current change rate ($\Delta$Imon) calculated as a result of the determination in operation mode 308 is equal to or less than the preset first change rate ($\Delta$Ith1), the electronic control unit 200 determines whether the motor current has reached a target current (Itarget) (309). If the motor current has reached the target current (Itarget) as a result of the determination in operation mode 309, the electronic control unit 200 moves to operation mode 318 to stop the electric motor 141 according to the completion of the parking operation. On the other hand, if the motor current has not reached the target current (Itarget) as a result of the determination in operation mode 309, the electronic control unit 200 moves to operation mode 302 to perform the following operation modes.

On the other hand, when the motor current change rate ($\Delta$Imon) calculated as a result of the determination in operation mode 308 exceeds the preset first change rate ($\Delta$Ith1), the electronic control unit 200 calculates and accumulates the electric charge mount (Q=It) supplied to the electric motor 141 from the time when the calculated motor current change rate ($\Delta$Imon) exceeds the preset first change rate ($\Delta$Ith1) (310).

Then, the electronic control unit 200 compares the accumulated electric charge amount (Q) with a preset charge amount (Qth) to determine whether the accumulated electric charge amount (Q) exceeds the preset electric charge amount (Qth) (312).

If the accumulated electric charge amount (Q) exceeds the preset electric charge amount (Qth) as a result of the determination in operation mode 312, it is determined that a motor stuck failure has occurred (314), and the motor stuck failure is notified to a driver through the warning unit 250 (316), and the electric motor 141 is stopped through the motor driving unit 230 (318).

On the other hand, if the accumulated electric charge amount (Q) does not exceed the preset electric charge amount (Qth) as a result of the determination in operation mode 312, it is determined whether the motor current change rate ($\Delta$Imon) is less than a second preset change rate ($\Delta$ith2) (320). If the motor current change rate ($\Delta$Imon) is not less than the preset second change rate ($\Delta$ith2) as a result of the determination in operation mode 320, the electronic control unit 200 moves to operation mode 310 to perform the following operation modes. On the other hand, if the motor current change rate (ΔImon) is less than the preset second change rate (Δith2) as a result of the determination in operation mode 320, the accumulated charge amount is reset and moved to a preset routine.

In the above-described embodiment, a description has been given of the determination of the stuck failure of the electric motor 141 using the motor current change rate and the accumulated electric charge amount, but the present disclosure is not limited thereto. For example, the amount of electric charge put into the electric motor is calculated using the motor current during the parking operation, the calculated electric charge amount is accumulated, and it may be determined that a stuck failure of the electric motor 141 has occurred if the change rate of the accumulated electric charge amount is higher than a preset rate change.

As is apparent from the above, the embodiment of the present disclosure can more accurately and reliably determine the failure of the motor of the EPB actuator, thereby preventing malfunction of the EPB system and improving safety.

The embodiment of the present disclosure can shorten a motor failure detection time compared to the conventional technique, can detect a motor failure even when there is a large amount of noise component in the motor current, and can detect a motor failure even when the motor current is reduced due to heat generation or demagnetization of the motor.

The embodiment of the present disclosure can detect a motor failure regardless of the magnitude of the motor current and can detect a motor failure more quickly when the motor current is a high current.

What is claimed is:

1. An electronic parking brake system which comprises an EPB (Electronic Parking Brake) actuator operated by an electric motor, comprising:
   an electronic circuit for driving the electric motor of the EPB actuator;
   a current sensor for sensing a current flowing in the electric motor; and
   an electronic control unit configured to:
   when a motor current change rate according to the current sensed through the current sensor during a parking operation is higher than a first preset change rate at a first time point, accumulate an electric charge amount put into the electric motor from the first time point, and
   determine a stuck failure of the electric motor based on the accumulated electric charge amount,
   wherein the current flowing in the electric motor is kept constant after the first time point.

2. The electronic parking brake system according to claim 1,
   wherein the electric charge amount put into the electric motor is accumulated from the first time point at which the motor current change rate is higher than the first preset change rate until the motor current change rate is lower than a second preset change rate preset to be lower than the first preset change rate.

3. The electronic parking brake system according to claim 1,
   wherein the electronic control unit determines the stuck failure of the electric motor when the accumulated electric charge amount is larger than a preset electric charge amount.

4. An electronic parking brake system which comprises an EPB (Electronic Parking Brake) actuator operated by an electric motor, comprising:
   an electronic circuit for driving the electric motor of the EPB actuator;
   a current sensor for sensing a current flowing in the electric motor; and
   an electronic control unit configured to:
   calculate an electric charge amount put into the electric motor utilizing the current sensed through the current sensor during a parking operation,
   a motor current change rate according to the current sensed through the current sensor during the parking operation is higher than a first preset change rate at a first time point, accumulate the calculated electric charge amount from the first time point, and
   determine a stuck failure of the electric motor when a change rate of the accumulated electric charge amount is higher than a preset change rate,
   wherein the current flowing in the electric motor is kept constant after the first time point.

5. A control method of an electronic parking brake system comprising an EPB (Electronic Parking Brake) actuator operated by an electric motor, comprising:
   sensing a current flowing in the electric motor during a parking operation;
   calculating a motor current change rate according to the sensed motor current;
   when a motor current change rate according to the current sensed through the current sensor is higher than a first preset change rate at a first time point, accumulating an electric charge amount put into the electric motor from the first time point; and
   determining a stuck failure of the electric motor when the accumulated electric charge amount is larger than a preset electric charge amount,
   wherein the current flowing in the electric motor is kept constant after the first time point.

6. The control method according to claim 5,
   wherein the step of accumulating includes accumulating the electric charge amount put into the electric motor from the first time point at which the motor current change rate is higher than the first preset change rate until the motor current change rate is lower than a second preset change rate preset to be lower than the first preset change rate.

7. An control method of an electronic parking brake system comprising an EPB (Electronic Parking Brake) actuator operated by an electric motor, comprising:
   sensing a current flowing in the electric motor during a parking operation;
   calculating an electric charge amount put into the electric motor utilizing the sensed motor current;
   when a motor current change rate according to the current sensed through the current sensor is higher than a first preset change rate at a first time point, accumulating the calculated electric charge amount from the first time point; and
   determining a stuck failure of the electric motor when a change rate of the accumulated electric charge amount is higher than a preset change rate,
   wherein the current flowing in the electric motor is kept constant after the first time point.

8. The electronic parking brake system according to claim 1, wherein the stuck failure of the electric motor is a failure state where mechanical sticking in the electric motor occurs and the electric motor is not driven.

\* \* \* \* \*